United States Patent

[11] 3,536,255

[72] Inventor Laurence Allan Cross, Jr.
Groveville, New Jersey

[21] Appl. No. 773,895
[22] Filed Nov. 6, 1968
Continuation-in-part of Ser. No. 438,216, Mar. 9, 1965, now Patent No. 3,486,617.
[45] Patented Oct. 27, 1970

[73] Assignee Randomatic Data Systems, Inc.
Trenton, New Jersey
a corporation of New Jersey

[54] PUNCH MECHANISM FOR RANDOM CARD FILING AND AUTOMATIC RETRIEVAL EQUIPMENT
12 Claims, 13 Drawing Figs.

[52] U.S. Cl. 234/30, 234/48, 234/54, 234/82, 234/108, 234/130
[51] Int. Cl. G06k 1/16, G06k 13/07
[50] Field of Search 234/30, 32, 46, 47, 48, 53, 54, 82, 108, 130

[56] References Cited

UNITED STATES PATENTS

| | | | |
|---|---|---|---|
| 1,761,682 | 6/1930 | Reynolds | 234/64 |
| 2,041,085 | 5/1936 | Nevin | 234/130X |
| 2,419,781 | 4/1947 | Keefe | 234/46X |
| 2,618,338 | 11/1952 | Bennes | 234/108X |
| 2,703,142 | 3/1955 | Maul et al. | 234/130X |
| 2,884,064 | 4/1959 | Doty et al. | 234/64X |

*Primary Examiner*—William S. Lawson
*Attorney*—Sperry and Zoda

ABSTRACT: A mechanism for edge-coding cards of an information storage and retrieval apparatus in which randomly filed cards are selected by electromechanical response to keyboard operations. The mechanism is operable by the same keyboard that is normally used for card selection. Impression of code numbers of the keyboard steps a card carrier across a bank of punches, to locate the card in punching positions corresponding to the positions of coded digits of the complete code number. The same depression of a key actuates a punch or punches to code-notch the card in each such position.

INVENTOR.
*LAURENCE ALLAN CROSS JR.*

BY SPERRY & ZODA
ATTORNEYS

INVENTOR.
LAURENCE ALLAN CROSS JR.
BY SPERRY & ZODA
ATTORNEYS

INVENTOR.
*LAURENCE ALLAN CROSS JR.*

BY SPERRY & ZODA
ATTORNEYS

INVENTOR.
LAURENCE ALLAN CROSS JR.

BY SPERRY & ZODA
ATTORNEYS

INVENTOR.
LAURENCE ALLAN CROSS JR.
BY SPERRY & ZODA
ATTORNEYS

PUNCH MECHANISM FOR RANDOM CARD FILING AND AUTOMATIC RETRIEVAL EQUIPMENT

CROSS-REFERENCES TO RELATED APPLICATIONS

The present application is a continuation-in-part of application Ser. No. 438,216 filed Mar. 9, 1965, now U.S. Pat. No. 3,486,617.

BACKGROUND OF INVENTION

1. Field of Invention

The invention pertains to the information storage and retrieval art generally, and more particularly relates to punch mechanisms for coding cards that are to be randomly filed for retrieval responsive to impression of wanted codes upon the storage and retrieval equipment in which the cards are filed. The invention, thus, is in the field of selective cutting, as for example by punching, of information-carrying elements to impress a selected code number thereupon. In a modified form, the invention may appropriately be considered as coming within the field of sensing the code of a previously punched card to produce operation of a punch assembly in a sequence effective to punch one or more additional cards correspondingly to the card already punched.

2. Description of the Prior Art

Heretofore, the prior art has required either the provision of excessively complex punching mechanisms including, for example, a separate punch for each and every code position in each code zone; or alternatively, excessively slow operation involving manual operations to such a degree as to increase to a marked degree the cost of punching individual cards. And, in other instances in the prior art, the punching mechanism has of necessity, by reason of its design, been a completely separate piece of equipment, having no relation or operational connections with the card selection and retrieval apparatus, with the possible exception that the punching mechanism does punch the cards that are intended for use in such apparatus. The following patents already issued to me are typical of arrangements that have heretofore been employed: U.S. Pat. No. 3,231,186, issued Jan. 25, 1966; U.S. Pat. No. 3,292,631, issued Dec. 20, 1966; and U.S. Pat. No. 3,303,492, issued Feb. 7, 1967.

SUMMARY OF THE INVENTION

The invention, found to solve effectively the problems noted in the prior art, includes a compact support frame, on which a card carrier or carriage is mounted for reciprocating movement, and is advanced step by step by a solenoid-controlled pawl-and-rack assembly. A bank of solenoid controlled punches is mounted upon the support frame or chassis, and each position to which the carrier is stepped exposes a new area of the card to the punches. The punches are operated singly or in multiples, to apply a predetermined code to the card by notching, preferably along an edge of the card. Responsive to the depression of a number key of a keyboard that may be located remotely from the punch mechanism constituting the invention, the stepping means advances the carriage to its next coding position, and the same depression of a number key is operative to actuate the corresponding punch or punches to notch the advanced card.

The card is advanced through a number of steps corresponding to the number of digits in the complete, coded number impressed by the punch mechanism upon the card or equivalent information-bearing element. In this connection, a preferred code that is well-fitted for punching into the card by means of the present invention would be that shown in my U.S. Pat. No. 3,389,242 issued June 18, 1968.

The invention also includes means normally preventing insertion of a card whenever the card carrier is in other than its initial position. This interlock prevents erroneous location of the code notches punched into the card, and assures that the initiation of the punching operation will occur only with the card in its proper position. The card-blocking means is so arranged as to be automatically withdrawn from its operative, blocking position responsive to return of the carrier to its starting position.

The invention thus solves some of the problems existing in the prior art, by reason of the fact that a bank of punches need comprise no more than five individual punches, in all, to impress any code digits from 0 through 9. Other limitations of more expensive, complex punching mechanisms known in the prior art are also effectively removed by the invention despite the simplicity of its construction. Thus, the stepping of the card carrier can be through any number of positions, whereby the coded information can be of any length desired as regards the total number of digits therein. One need merely, in this regard, modify the pawl-and-rack means for this purpose since the total number of positions through which the card carrier may be stepped is dependent only upon the number of steps or notches in the rack element of the advancing means.

DESCRIPTION OF THE PREFERRED EMBODIMENTS

Figure 1:
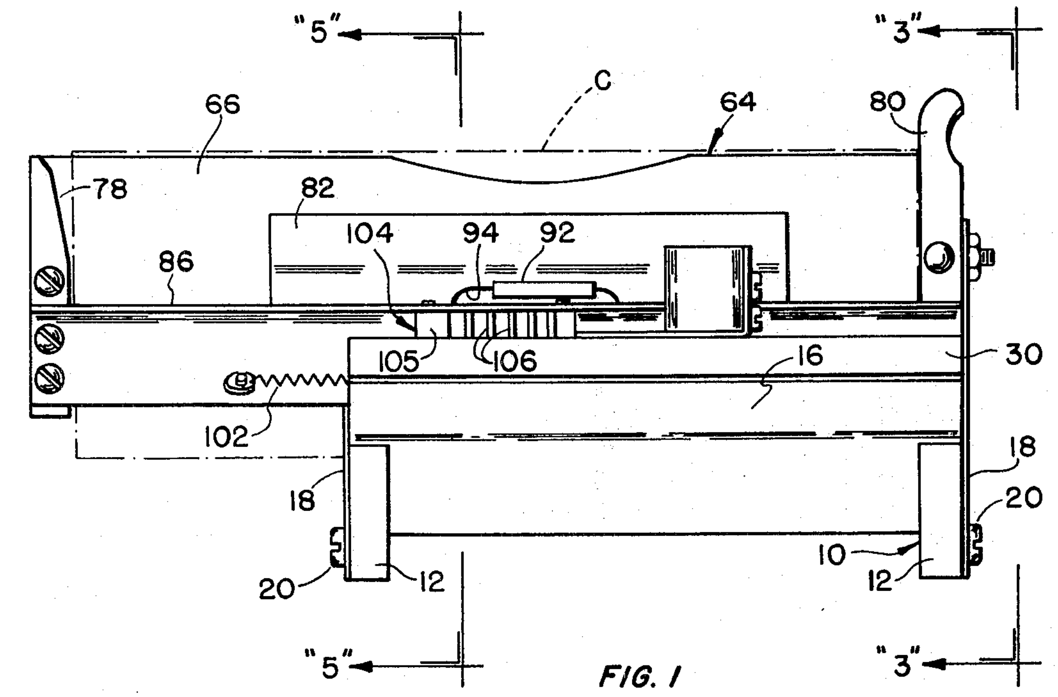
FIG. 1 is a front elevational view of a punch mechanism according to the present invention, an inserted card being shown in dotted lines.
Figure 2:
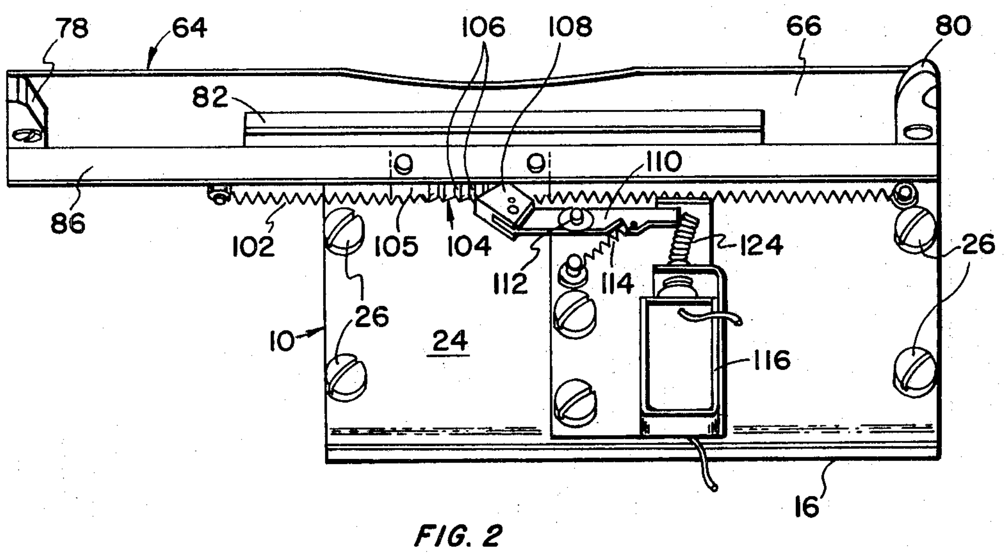
FIG. 2 is a top plan view of the mechanism.
Figure 4:
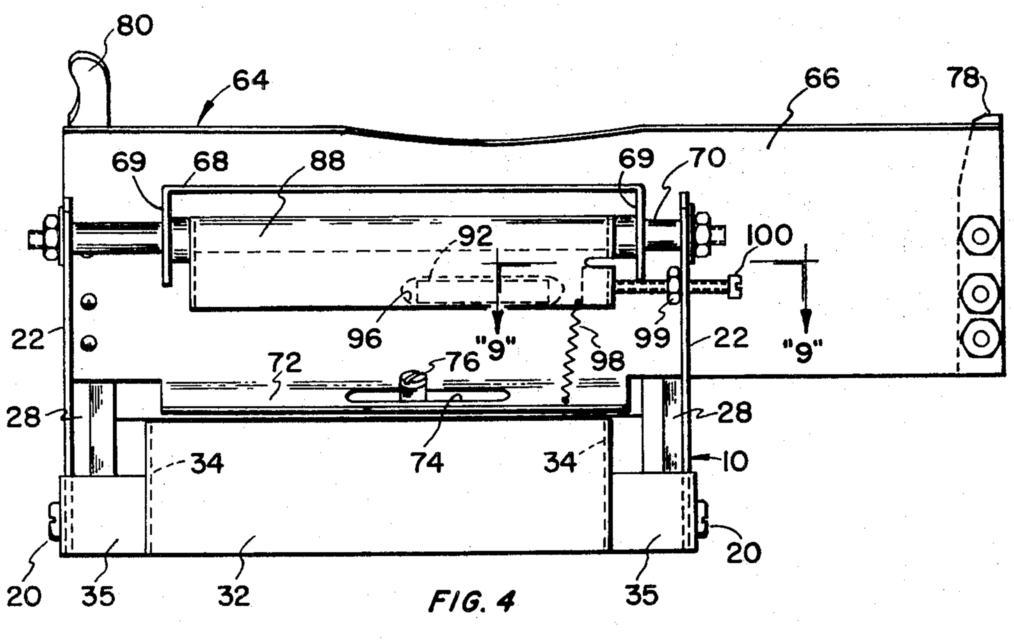
FIG. 4 is a rear elevational view of the device.
Figure 3:
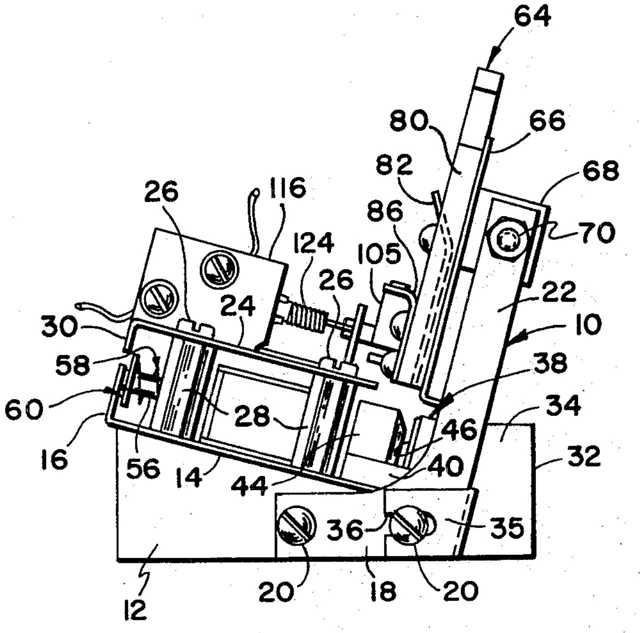
FIG. 3 is an end elevational view of the device as seen from line 3–3 of FIG. 1.
Figure 5:
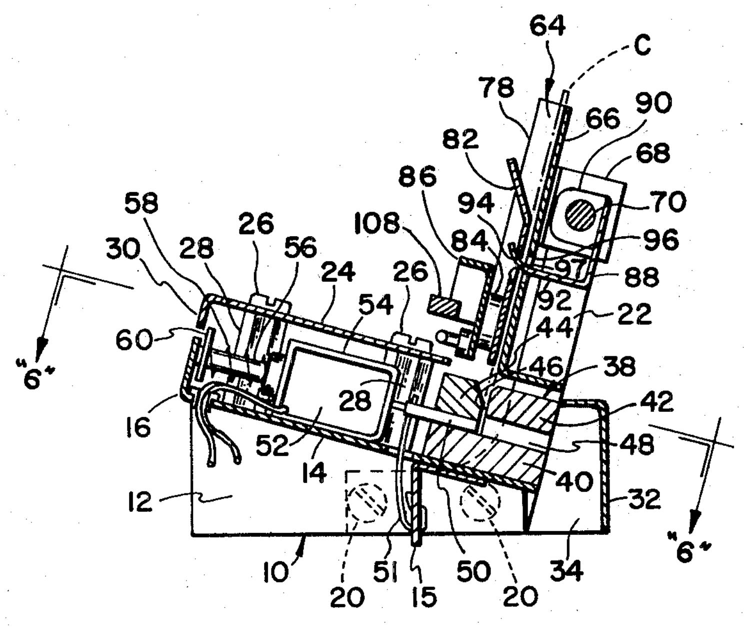
FIG. 5 is a transverse sectional view substantially on line 5–5 of FIG. 1.

In the form of the invention shown in FIGS. 1—6, the device includes a support frame or chassis generally designated 10. This includes a pair of base plates 12 disposed at the opposite ends of the device, said plates having rearwardly declining top surfaces as best shown in FIGS. 3 and 5. A bed plate 14 is secured to the top surfaces of the base plates 12, so as to be disposed in a rearwardly declining position in correspondence with the slopes of the top surfaces of plates 12. A spring retainer plate 15 (see FIG. 5) is secured to the underside of the bed plate 14, adjacent the rear edge thereof, and is of acute-angular section, said spring retainer plate extending the substantially full distance between base plates 12 in parallel relation to the rear edge of the bed plate.

Integrally formed upon the front edge of bed plate 14 is an upturned flange 16.

End plates 18 of frame 10 include horizontally forwardly projecting lower portions secured by screws 20 to the respective base plates 12. The end plates have upwardly projecting portions 22, extending normally to the plane of bed plate 14.

A cover plate 24 is spaced upwardly from bed plate 14, in a plane parallel to that of the bed plate, and is secured fixedly to the bed plate by means of screws 26 engaging in threaded openings of spacers 28 fixed to and extending upwardly from the respective ends of the bed plate 14. On the front edge of cover plate 24 there is formed a depending front flange 30 extending downwardly toward and coplanar with flange 16 of the bed plate.

A chad receiver 32 is removably engaged against the back of the supporting frame, and positioned to receive scraps punched out of the cards. Integral with end walls 34 of receiver 32 are outwardly offset, forwardly projecting arms 35 having forwardly opening slots 36 (see FIG. 3) engaging the rear pair of screws 20.

Fixedly mounted upon the frame 10 is a die block and punch assembly generally designated 38. This includes (see FIG. 5) a base block 40, extending longitudinally of the support frame along the rear edge thereof, over the full distance between base plates 12 of the frame. Base block 40, and in fact the entire die block and punch assembly 38, is tilted transversely as best shown in FIG. 5, correspondingly to the rearward declination of bed plate 14. An inserted card C is supported in punching position with its bottom edge in contact with the top surface of base block 40, that is, block 40 limits the downward movement of the card when it is inserted.

Fixedly secured to and coextensive in length with the base block 40 is a rear die block 42 and front block 44, spaced apart slightly more than the thickness of a card C, to define a card receiving slot 46 therebetween (FIGS. 3 and 5). This is in communication with a chad discharge slot 48 extending the full length of the punching area and opening rearwardly into the receiver 32.

A bank of normally retracted punches 50 serves to provide the cutting means whereby notches or their equivalents are punched into the bottom edges of the inserted cards. Punches 50, when advanced for notching purposes, are projected across the card slot 46, into the die block 42.

In accordance with the invention, the punch mechanism requires only as many punches 50 as there are channels in the particular code that is to be punched into the cards. Thus, let it be assumed that the code to be punched is the specially-modified binary code covered by my U.S. Pat. No. 3,389,242 issued June 18, 1968. That code uses five channels. The digits 0—9 are represented by particular pairs of said channels.

Therefore, if such a code is utilized, five punches 50 would be needed. The present invention, accordingly, is illustrated with five punches. However, it will be understood that this number may be increased or decreased, according to the particular code that is being impressed upon the cards.

Each punch is normally retracted through the provision of a return spring 51, in the form of a length of spring wire material (see FIG. 5), the upper end of which is positioned through a transverse opening provided at the distal end of the associated punch. At its lower end, the return spring 51 associated with each punch is formed with a loop, engaged in openings provided in the vertical depending flange portion of spring retainer plate 15.

Against the restraint of the spring 51, the several punches 50 are advanced for punching purposes by a solenoid assembly 52 including a solenoid 54 associated with each punch 50.

The several solenoids 54 are fixedly mounted upon the bed plate 14, with the cores or plungers 56 thereof coaxially aligned with their associated punches 50. The plungers of the solenoids are in abutting relation at their forward ends, with the rear ends of the punches 50, so that when the solenoids are energized, plungers 56 are advanced from normally retracted positions thereof shown in FIG. 5, against the restraint of compression return springs 58 connected between the respective plungers and a spring support bar 60 secured to the front of frame 10 by screws 62.

If as discussed above, the code is binary and requires simultaneous advancement of a selected pair of punches 50, a corresponding pair of the solenoids will be simultaneously energized for the purpose of advancing their associated punches.

A card carrier assembly generally designated 64 is also mounted upon the support frame, and includes an elongated, flat back plate 66 extending upwardly from the support frame, in a plane inclined from the vertical at right angles to the inclined plane of the bank of punches 50. Plate 66 is mounted for horizontal back and forth movement in its own plane. In FIG. 1, it is shown in its starting position, from which it is advanced step by step to the right in FIG. 1, to its opposite extreme position.

Supporting the back plate 66 for its back and forth motion in respect to its frame or chassis 10 is an elongated, horizontally extending support bracket 68 (see FIG. 4), having rearwardly projected end portions 69 apertured to slidably receive a support or guide rod 70 fixedly secured at its ends to and extending between the respective, upwardly projecting portions 22 of the end plates 18.

Figures 8, 10A, 10B:
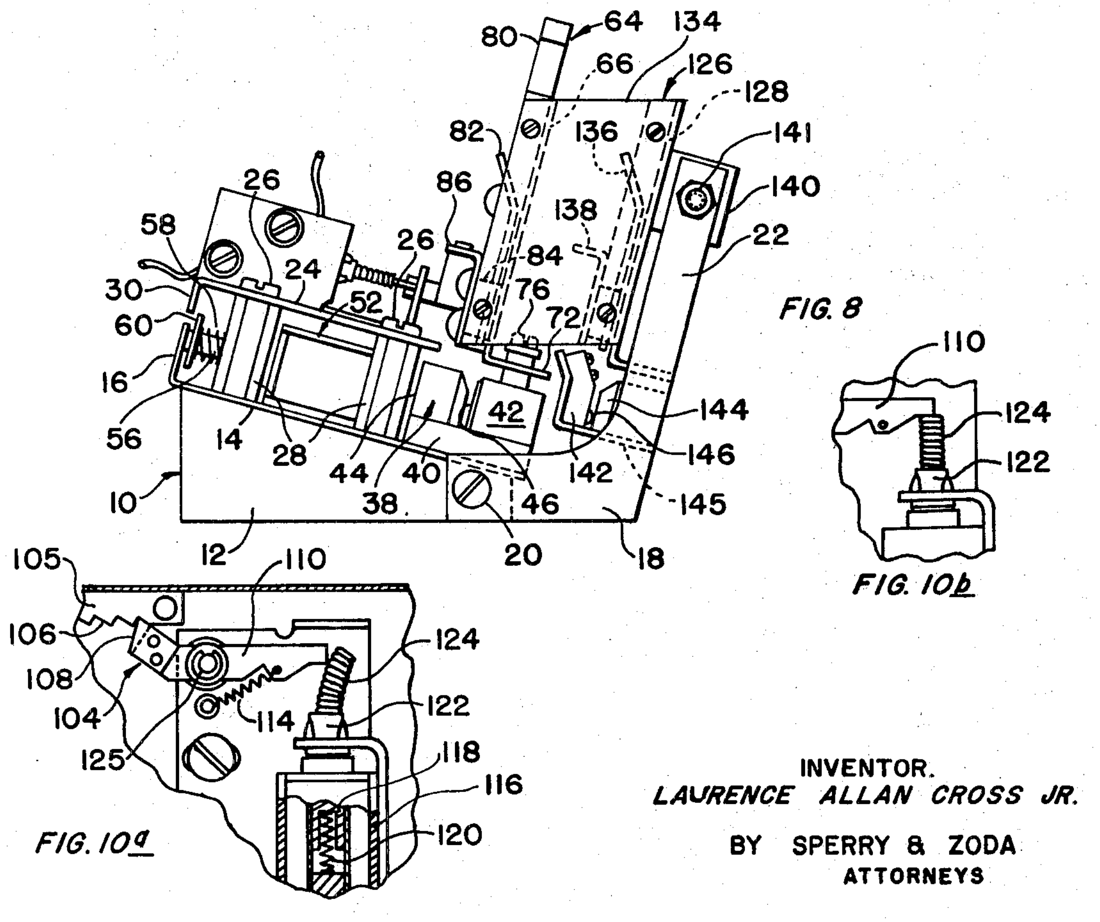
FIG. 8 is an end elevational view of the form of the invention shown in FIG. 7, as seen from line 8–8 of FIG. 7.
FIG. 10*a* is a fragmentary, detail, horizontal section showing the pawl-and-rack assembly with the escapement solenoid plunger and escapement extended following disengagement of the pawl from a notch of the rack and its engagement in the next adjacent notch.
FIG. 10*b* is a view similar to FIG. 10*a* showing the plunger and escapement retracted preliminary to actuation of the pawl and its consequent disengagement from a notch of the rack.

Integrally formed upon the lower edge portion of back plate 66 is a rearwardly projecting flange 72 having in it a longitudinal slot 74, into which extends a guide pin 76 secured to and projecting upwardly from the rear die block 42 (see FIG. 8).

The guide pin limits the movement of the card carrier 64 to the right in FIG. 2, to its final position at the completion of a card punching cycle.

In order to properly position a card C within the card carrier or carriage 64, I provide end card guides 78, 80 respectively attached to the respective ends of the back plate 66.

Also provided for the purpose of guiding the card into proper position and retaining it in said position while being punched is a guide plate 82, having an outwardly forwardly inclined upper edge portion to provide a wide entrance way in cooperation with back plate 66, for the inserted card (see FIG. 5). The plate 82 is fixedly secured to the card carrier 64 by means of spacers 84 secured to an elongated support bar 86 that is fixedly mounted upon and extends between the respective end guides 78, 80 as best shown in FIG. 2 and FIG. 5. The plate 82 is spaced from plate 66 a distance only very slightly greater than the thickness of the inserted card, thus to insure that the card will be held flat against the plate 66 while being punched.

Means is incorporated in the card carrier assembly 64 to prevent insertion of a card whenever the carrier is in other than its starting position. This is important, in that it will prevent cards from being erroneously punched. The exact location of the code notches on the edge of a card is of paramount importance, as will be understood when a code is used such as is disclosed in my U.S. Pat. No. 3,389,242 above mentioned. Such coded information requires a plurality of zones, in each of which there is a series of notching areas or code notch positions, the total number of which corresponds to the total number of digits in the complete code number that is being impressed upon the card. Obviously, if a card is not in proper position in respect to the bank of punches at the beginning of the punching operation, the code number punched into the card will be translated one or more notch positions from that intended. It is for this reason, accordingly, that card blocking means is incorporated in the structure, normally preventing insertion of a card, when the card carrier is displaced from its initial position, but automatically retracting to permit card insertion if the card carrier is in its initial position.

To this end, the card blocking means (see FIG. 5) includes an elongated bar 88 of approximately L-shaped section, disposed in back of the plate 66 and integrally formed at its ends with forwardly projecting ears 90 apertured to loosely receive the rod 70. Bar 88 is thus supported upon rod 70 for rocking motion about an axis parallel to the plane of the plate 66.

Bar 88 includes a forwardly projecting lower portion 92, the front edge of which is curved upwardly as at 94 and extends through horizontal slots 96 and 97 of plates 66 and 82 respectively as shown in FIG. 5.

Referring to FIG. 4, an extension spring 98 is connected between flange 72 of plate 66 and the card-blocking bar 88. Spring 98 produces a clockwise moment tending to rock bar 88 to its blocking position shown in FIG. 5, and in these circumstances a card C cannot be inserted.

Figure 9:
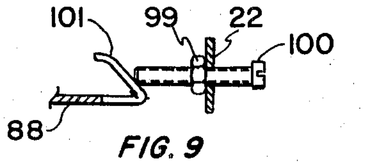
FIG. 9 is a detail sectional view of a means for retracting a card-blocking bar, taken substantially on line 9–9 of FIG. 4.

Whenever the card carrier is moved from its final position at the completion of a card-punching cycle back to its initial position shown in FIG. 1, its movement toward its starting position, will ultimately cause an adjustable actuating stop 100 (which can comprise a screw threadedly engaged in adjacent end plate 22 and locked in its selected adjusted position by nut 99), to engage a cam surface 101 formed upon the adjacent end of the blocking bar 88. This is shown to particular advantage in FIG. 9.

A further movement of the carrier to its initial position causes the blocking bar 88 to be cammed out of its card blocking position, thus retracting the portion 92 from the space in which the card is inserted between plates 66, 82.

The card may thus be inserted, and the punching cycle initiated. The inserted card blocks slot 97 in plate 82 once the camming surface 101 disengages from actuating stop 100. At the completion of the punching cycle, removal of the card unblocks the slot and permits the card blocking means to return to its normal position under the pull of the spring 98.

Carrier 64 is normally urged toward its final position by means of an extended expansion spring 102 (see FIG. 2) connected between support bar 86 and the cover plate 24.

Movement of the carrier to its initial position, against the yieldable restraint of spring 102, is effected manually in the present form, but obviously, could be carried out electrically by a suitable solenoid means or other suitable transducer, energized either by manual or automatic operation at the completion of each card punching cycle.

Controlling the step-by-step advancement of the card carrier is a pawl-and-rack assembly generally designated 104. This includes a rack 105 fixedly secured to bar 86 and formed with a series of teeth or serrations 106 providing stops, one for each position to which the card carrier is stepped during a cycle, in which the head 108 of a pawl 110, pivoted at 125 upon cover plate 24, engages under the pressure of a spring 114 connected between the pawl and a pin 112 on said cover plate.

A control solenoid for the pawl-and-rack assembly is designated 116 and is fixedly mounted upon the cover plate 24. Solenoid 116 has a plunger 118 normally biased outwardly by a compression spring 120 within the solenoid (see FIG. 10*a*). Affixed to the other end of plunger 118 is a coil of wire 124. This coil of wire has closed coils, and provides a resiliently laterally deflectable extension to the solenoid plunger. With pawl 110 in the normally latched position the close-wound coil 124 will be laterally deflected as shown in FIG. 10*a*.

Pawl 110 has an elongated hole engaging the associated pivot 125. Spring 114 produces a pawl-biasing force to the left and a clockwise moment tending to rotate the pawl head 108 into engagement with one of the rack teeth. The carriage drive spring 102 is sufficiently preloaded to overcome the pawl-biasing force of spring 114 causing pawl assembly 104 to be translated to the right until the left extremity of the elongated hole in the pawl 110 rests against the pivot 112 and pawl head 108 is intimately in contact with one of the escapement rack teeth 106 (see FIG. 10*a*).

Stepping of the carrier is effected as follows: When solenoid 116 is energized plunger 118 is retracted, compressing plunger return spring 120, and, locating the end of the close-wound trip coil or escapement 124 in the path of the heel of pawl 110 (see FIG. 10*b*). The latched pawl assembly 110 as described above, is unaffected during the solenoid plunger retraction interval.

When solenoid 116 is deenergized, plunger 118 is released, and is moved axially when compression spring 120 expands. Coil 124 forcefully engages the heel of pawl 110 causing said pawl to rotate counterclockwise from its position shown in FIG. 10*a*, expanding pawl spring 114. The rotative motion continues until pawl head 108 disengages from rack notch 106, allowing pawl assembly 110 to be translated to the left via pawl spring 114, and card carrier 64 to be translated to the right by carrier drive spring 102. Lateral motion of pawl 110 is limited by an elongated hole 150 to clear the path of the pawl trip 124. The persisting force applied by pawl spring 114 produces a moment and the motion of pawl 110 becomes rotative in a clockwise direction causing pawl head 108 to enter the next rack notch position. The lateral motion of carrier 64 causes the interfering tooth of rack 105 to engage pawl head 108 and subsequently translate pawl 110 to the right. When the left boundary of pawl slot 150 engages pivot 125, the carrier and pawl motion stops. Briefly stated, pawl head 108 is cleared from the engaging rack tooth position and is immediately pivoted into the following rack notch to engage the succeeding rack tooth for a single rack pitch incremental step. The card carrier is advanced in step-by-step increments and positions prescribed areas of the inserted card to the bank of punches 50 for programmed notching.

This operation of step-by-step advancement of the card carrier is carried out in a prescribed correlation to the energizing of a selected punch actuating solenoid or solenoids 54.

OPERATION

Figure 11:
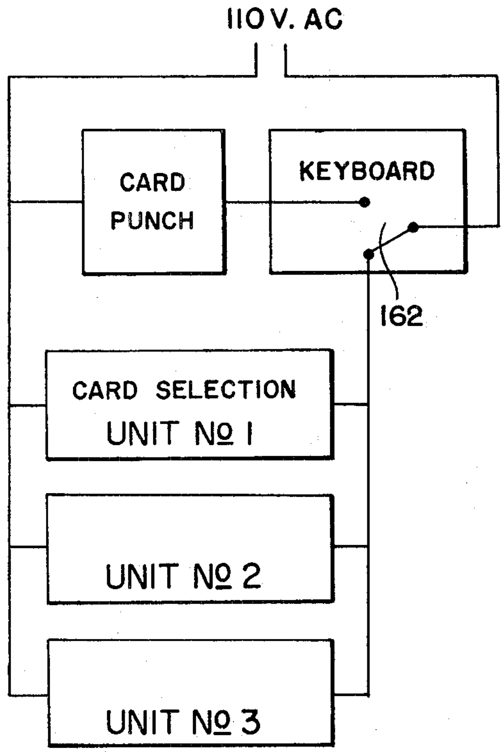
FIG. 11 is a schematic showing of a typical card punch and card selection system in which the invention may be incorporated.
Figure 6:
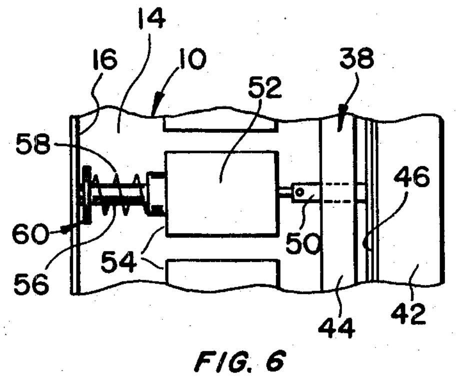
FIG. 6 is a partial horizontal section through the device, substantially on line 6–6 of FIG. 5.

In use of the basic device shown in FIGS. 1—6, 9, and 10 a typical complete system might be set up as shown up in FIG. 11. This would include a keyboard shown only diagrammatically in the drawing, having a connection to a source of electrical current. The keyboard is connected to a card punch mechanism constructed as described and illustrated herein, and is also connected to one or more card selection units. These may, for example, be of a type shown in my copending application Ser. No. 438,216.

By means of a switch at the output side of the keyboard, circuitry, the keyboard impulses may be directed either to the card punch or to the card selection unit or units. Assuming that one is punching cards, the switch would be operated at the keyboard to direct its output to the card punch mechanism, to the exclusion of the card selection unit.

The user first shifts the carriage 64 to its FIG. 1 position, and in the circumstances, the pawl will ratchet over the series of notches or serrations 106, so as to engage in the notch 106 disposed at the right hand end of the series of notches, viewing the same as in FIG. 1. Spring 102, tending to contract, biases the pawl toward the right in FIG. 2, causing the pawl to bear against the side of escapement 124, thus rocking the escapement to its FIG. 2 position. At this time, solenoid 116 is in the deenergized condition and this is true also of the several punch actuating solenoids 54.

In the circumstances, the card blocking bar 88 will have been retracted, because the pin 100 will have engaged cam surface 101 when the carrier was moved to its FIG. 2 position. A card C (FIG. 5) can thus be inserted and will be disposed in its initial punching position, with its edge area disposed where notching thereof will code the card to the first digit of the complete series of digits or other characters for which it is to be coded.

The user now depresses the key selected for punching the first digit or other code character. This energizes solenoid 116, retracting it to its FIG. 10*b* position, and simultaneously energizes the particular solenoid or solenoids 54 that correspond to the code key selected. The punches 50 associated with the selected solenoid or solenoids 54 are thus advanced to notch the card in its first digit position area, responsive to energizing of said solenoid or solenoids 54 corresponding to the depressed key.

The solenoid 116 and the selected solenoid or solenoids 54 are instantly deenergized, and punches 50 are retracted by their associated springs 51, with the plungers 56 of the selected solenoids 54 also being retracted by their associated springs 58.

Concurrently, with retraction of the punches, the plunger 118 is projected forwardly by spring 120 from the FIG. 10*b* position, and strikes pawl 110 as previously described herein causing the carrier to be advanced one step, with the escapement trip spring 124 and pawl 110 now being once again in their normal, between-cycles positions shown in FIG. 10*a*.

Depression of the key to code the card for its second digit or code character causes the cycle to be repeated, with the card now being punched in the appropriate, second-digit-position area thereof, and the punching of the card will now continue until the card has been advanced through all the steps permitted by the rack 105. At the conclusion of the coding of the card for its complete number, the user removes the card and the card-blocking bar moves back into a blocking position, to prevent insertion of a new card until such time as the carrier 64 is once again manually returned to its starting position shown in FIGS. 1 and 2.

REPETITIVE PUNCHING ASSEMBLY

Figure 7:
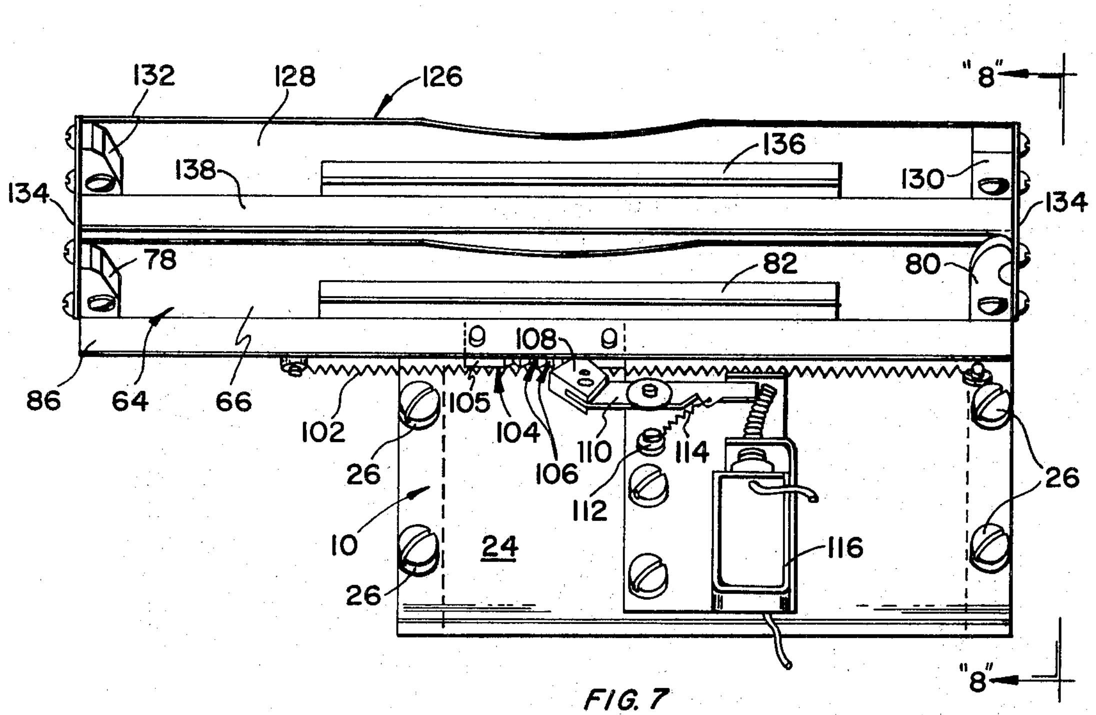
FIG. 7 is a top plan view of a modified construction wherein repetitive punching is permitted.

FIGS. 7 and 8 show a modified constuction, wherein one can punch a card as a duplicate of a card previously punched. Basically, this arrangement utilizes two card carriers, connected for joint step-by-step advancement. One card carrier receives a previously-punched card, while the other supports a card to be punched correspondingly to the card already coded.

The carrier holding the card that has already been coded is associated with a series of sensing switches, which sense the presence and particular location of code notches in the card already punched, and by appropriate circuitry, trigger a bank of punches correspondingly, to form in the new card notches that match those of the first card.

To this end, I provide a code sensor assembly generally designated 126, including a backing plate 128, to the opposite ends of which are secured end guides 130, 132. Connecting plates 134 are fixedly connected to and extend between corresponding ends of the backing plates 66 and the backing plate 128. As a result, the card carrier 64 and the assembly 126 are connected for joint movement.

A guide plate 136 is provided, to guide a previously punched card into position upon the plate 128. Guide plate 136 is mounted on a support bar 138 fixedly connected between the end guides 130, 132.

Instead of the mounting bracket being secured to the card carrier 64 as it is in FIG. 1—6, a mounting bracket 140 is instead secured to and projects rearwardly from plate 128. This is of U-shape, and slidably receives support rod 141 mounted on the upper end portions 22 of end plate 18. End plates 18 in this form of the invention, are moved rearwardly from the position thereof utilized in the first form of the invention.

In this form of the invention, switch support blocks 142, 144 are mounted upon a support bracket 145 connected between the end plates. A bank of sensing switches 146 is carried by the block 142, 144, with each switch 146 including feelers that extend across the space into which the previously punched card moves when inserted between plates 128, 136. As a result, the feelers 146 will be pressed rearwardly by any card area that has not been punched, whereas any notched area will clear the feeler 146 associated with that area, and will leave it in its FIG. 8 position extending across the card receiving space.

The switches that correspond to areas of the inserted card that have been notched will thus close a circuit to solenoid 116, and to those solenoids 54 that are associated with punches corresponding to these particular notching areas. The circuitry is so arranged that when the cards are in their first punching positions as they would be with the card carrier and the assembly 126 disposed in their FIG. 7 positions, the solenoid 116 will be energized, together with those solenoids 54 that represent the code digit sensed by switches 146 as the first digit of the complete code number. The new card will be punched, accordingly, correspondingly to the previously punched card so far as the first code digit position is concerned. Then, solenoid 116 and the energized solenoids 54 will be deenergized, and the assembly will be stepped to the next position. The operation thus continues until the new card is completely punched, as an exact duplicate of the previously punched card.

Obviously, a number of carriers 64 and their associated solenoids 54 and punches 50 will be selected according to the number of cards that are to be punched correspondingly to the already coded card. A single carrier 64 is shown by way of illustration, but there could be an entire series or bank of said carriers, each with their associated solenoid controlled punches, all operable conjointly in response to impulses fed thereto from the card sensor assembly 126.

Figure 12:
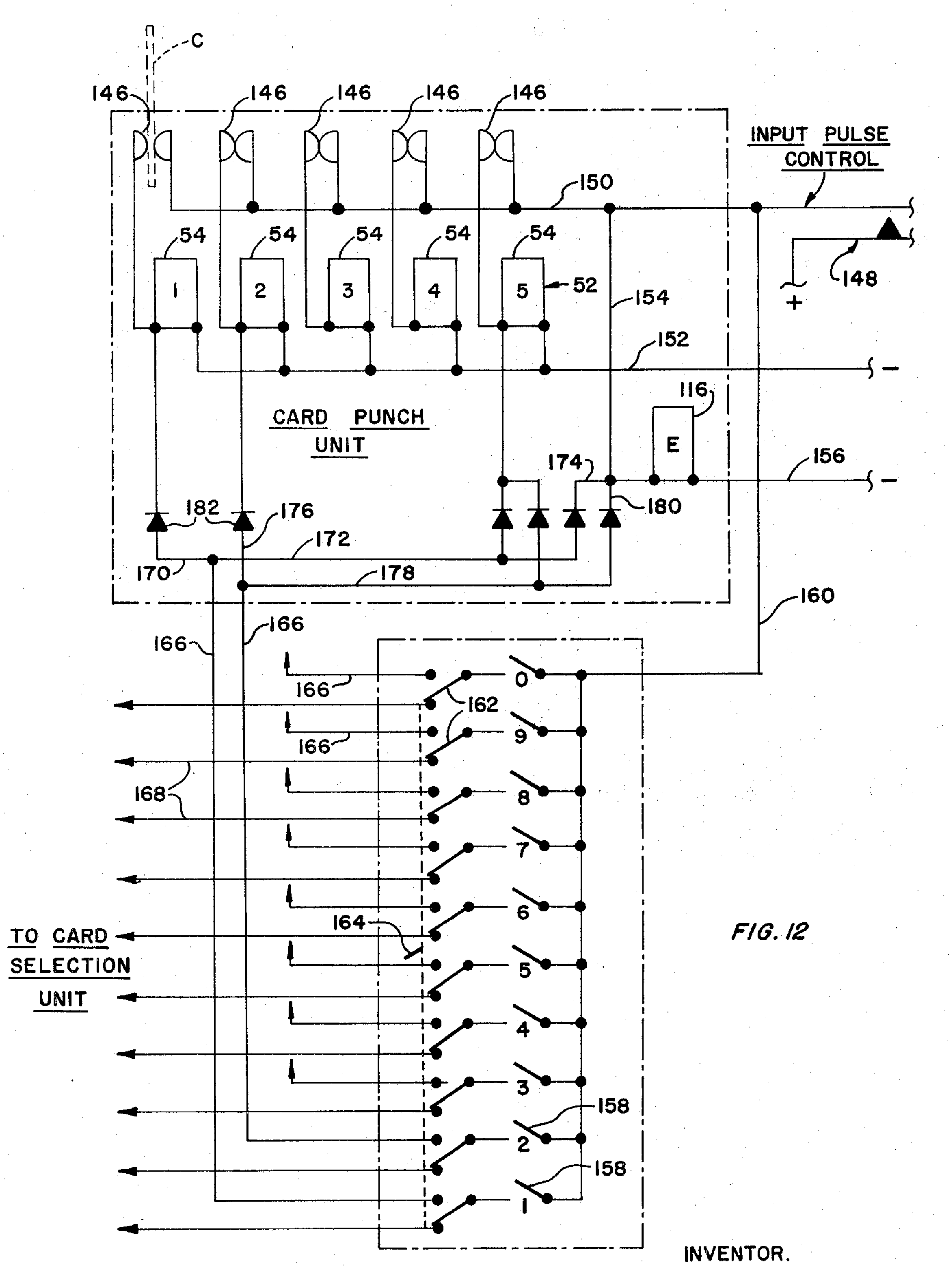
FIG. 12 is a wiring diagram showing a keyboard circuit and card punch circuit in operative relationship, the keyboard circuit being connected to a card selection unit, the card punch circuit being adapted for the form of card punch unit shown in FIGS. 7 and 8.

FIG. 12 illustrates, in somewhat simplified form, typical circuitry that can be employed for electrically connecting a keyboard of the type shown in my copending application Ser. No. 438,216, to a card punch unit according to the present invention, the same keyboard also being electrically connected to one or more card selection units of the type shown in said copending application Ser. No. 438,216.

An input pulse control means 148, which can be either manual or automatic, connects to a source of electrical power each of the several sensing switches 146, through a common input connection 150. Each sensing switch is in series between said source and one terminal of the particular punch solenoid 54 associated with that sensing switch. The other terminals of the several solenoids 54 have a common output 152 to complete the circuit to the electrical source.

Sensing switches 146 are normally closed, being spring tensioned to a closed position. Insertion of a card C, as previously described herein, will open any switch 146 unless there is a notch in registry with that switch.

Escapement solenoid 116 is also connected to the power source through a power supply lead 154, and has an output lead 156 returning to the source of power.

FIG. 12 illustrates schematically a keyboard which can be similar to that illustrated and described in my copending application Ser. No. 438,216. Essentially, the keyboard which can be physically remote from the card punch unit and from one or more card selection units of the type shown in my copending application Ser. No. 438,216, includes a series of key-operated switches 158, the keys of which would be numbered "1" through "0".

The several switches 158 have a common connection 160 to a source of electric power, the input pulse control means 148 being in series circuit between said source and the bank of switches 158.

Assuming that the keyboard is to be used for card selection, rather than for card punching, a card unit selection switch means 162 is employed to switch the keyboard into a connection either with the card punch unit, or alternatively, with a card selection unit or units such as shown in my copending application Ser. No. 438,216.

Switch means 162, in the illustrated example, comprises a plurality of like switches, each in series connection with associated switch 158. The several individual switches of the switch means or assembly 162 are connected for conjoint operation, by means of a common operating handle 164. Thus, by operation of handle 164 to one position thereof, the switch means 162 connects the bank of switches 158 to leads 166 going to a card punch unit formed according to the present invention. Operation of handle 164 to another position thereof disconnects switches 158 from said card punch unit, and connects the same to a card selection unit or units, through leads 168.

By reference to my copending application Ser. No. 438,216, it will be readily observed that assuming there are 10 switches 158, numbered "1" through "0", there would be 10 leads 168 extending to an associated card selection unit, and these leads, at the card selection unit, would have connections with a bank of five card selection solenoids and an escapement solenoid of the card selection unit (not shown). Using a code of the kind described in my U.S. Pat. No. 3,389,242, depression of a selected key of the keyboard would energize two of the card selection solenoids simultaneously with energizing of the escapement solenoid of the card selection unit.

Thus, when the keyboard is connected to the card selection unit, it will operate code number solenoids and an escapement solenoid corresponding exactly to the code number punching solenoids 54 and the escapement solenoid 116 of the present invention. The only difference is that when the keyboard is connected to the card selection unit, the solenoids are energized for the purpose of actuating card selection slide elements and a carriage that is advanced step by step to locate the solenoids in respect to the slide elements. When, on the other hand, the keyboard is connected to the card punch unit, depression of a particular key will feed power through its associated lead 166 to the appropriate pair of solenoids 54 and the escapement solenoid 116, to punch a card rather than actuate a slide element, and advance the card-supporting carriage step by step for the next punching operation.

It will be understood, at this point, that whether the card is being punched by manual operation of the switches 158 or by insertion of a previously punched card in code sensor assembly 126, the appropriate punch solenoid 154 and escapement solenoid 116 will be energized only momentarily, due to the fact that the input pulse control means 148 will be operative to stop the flow of power the instant that the appropriate punched solenoids are energized to punch a card, and solenoid 116 is energized to cause a one step advancement of carriage 64. As soon as the carriage is advanced, a user may depress the next, selected key operated switch 158 or, if the device of FIGS. 7 and 8 is being used to provide repetitive punching, the last previous advancement of the card carriage will close a new set of switches 146, to punch the card in the new punch area presented by said last advancement of the card. The pulse control means, as will be understood can comprise a relay energized with the solenoids to operate circuit opening contacts, or can comprise any other means for feeding, either manually or automatically, a momentary pulse to the solenoids of the punch unit.

By way of example, I have illustrated appropriate connections between the switches 158 designated "1" and "2", and their associated solenoids 54 and 116. Thus, using a code such as shown in U.S. Pat. No. 3,389,242, lead 166 extending from keyboard switch "1", has a connection 170, 172, to the punching solenoids 54 designated "1" and "5". Therefore, the card will be punched at two locations, to punch into the card the code digit "1", at a particular location of the card determinative of the position of this digit of the complete code number impressed upon the card.

Simultaneously, power is also supplied through lead 174 to the escapement solenoid 116, to advance the card to its next position.

In the same fashion, keyboard switch "2" is connected by its lead 166 to solenoids "2" and "5", through the provision of leads 176, 178. Keyboard switch "2" also is connected, by a lead 180, to an escapement solenoid 116.

The connections of the switches 158 designated "3" through "0", have not been specifically illustrated, since such additional connections are not necessary to an understanding of the present invention and are in any event shown both in my copending application Ser. No. 438,216 and my U.S. Pat. No. 3,389,242.

It is sufficient to note that each of these switches would have a connection through its associated lead 166 to an appropriate pair of solenoids 54 and would also have its own individual connection to solenoid 116.

In the same manner as shown in my copending application Ser. No. 438,216, I provide, in each lead going to a solenoid 54 and the solenoid 116, a blocking rectifier 182. This prevents the undesired energization of any solenoids other than the particular pair of solenoids 54 and the escapement solenoid 116, each time the card is punched.

It may be observed that although in FIG. 12 I have shown a card punch unit circuit including sensing switches 146, that is, a circuit that would be used with a card punch unit of FIGS. 7 and 8, said circuit could be modified for use with the basic card punch unit of FIGS. 1—6, merely by omitting the sensing switches 146, and providing instead a direct, continuous connection between the common input power lead 150 and each solenoid 54. In this arrangement, the solenoid 54 could be energized only from the keyboard as distinguished from the FIG. 12 showing wherein the card punch unit can be operated either from the keyboard, or by insertion of a previously punched card.

I claim:

1. A card punch device comprising:
   a. a stationary support frame;
   b. a card carrier movably mounted thereon;
   c. punch means mounted on the support frame and arranged to punch a card supported by the carrier; and
   d. means for advancing the card carrier step-by-step to expose successively following areas of the supported card to said punch means, including:
      1. a rack on the carrier having a tooth for each position to which the carrier is to be moved,
      2. a pawl on the frame normally biased into engagement with a rack tooth to restrain the carrier from advancement, and
      3. a solenoid on the frame including a plunger having a distal portion comprising a laterally shiftable extension to bias the pawl out of engagement with said tooth and thereafter be deflected laterally to free the pawl for engagement with the next adjacent tooth.

2. A card punch device as in claim 1 wherein said carrier includes means normally extending across the path in which a card is inserted in the carrier to block the insertion, and means carried by the frame biasing the card-blocking means out of said path responsive to shifting of the carrier to a starting position.

3. A card punch device as in claim 1 including a second card carrier movable conjointly with the first carrier, and means on the second carrier to sense punched areas of a card supported therein and actuate the punch means and the means for advancing the first carrier for punching a card supported on the first carrier correspondingly to a card supported by the second carrier.

4. A card punch device as in claim 1 wherein the punch means comprises a bank of punches corresponding in number to code zones of the card to be punched, said advancing means arranged to shift the card carrier across the bank of punches through a series of steps within each zone corresponding in number to the maximum number of digits of a coded number to be punched into the card.

5. A card punch device as in claim 4 wherein the punching means further includes a separate solenoid for each punch, a plurality of said solenoids being actuated simultaneously to impress each digit of the coded number upon the card being punched.

6. A card punch device as in claim 5 wherein the advancing means further includes a solenoid having an electrical connection to a plurality of solenoids of the punching means such that operation of a selected key to actuate corresponding, selected solenoids of the punch means will actuate the advancing solenoid to immediately thereafter shift the carrier one step to the next following punching position.

7. A card punch device as in claim 1, and said pawl being mounted for both rocking and endwise movement under spring bias tending to shift the same endwise out of the path of the plunger when the pawl is disengaged from the rack.

8. A card punch device as in claim 1 wherein the extension is resilient.

9. A card punch device as in claim 8 wherein said extensions is in the form of a coiled wire.

10. A card punch device as in claim 9 wherein the coils of said wire are closed, limiting the extension against compression longitudinally thereof while imparting thereto the characteristic of resilient flexure in the transverse direction.

11. A card punch device as in claim 1 wherein the pawl is slidably pivotally connected intermediate its ends to the frame, said pawl having a head at one end engaging the rack and having its other end engageable by said distal portion of the plunger, the bias applied to the pawl being applied in a direction to shift the same slidably on its pivot when the pawl is disengaged from the rack, to an extent sufficient to disengage said distal portion from the pawl and thereby free the pawl for engagement with said next adjacent rack tooth.

12. A card punch device as in claim 11 wherein the means for advancing the carrier includes a spring tensioned to advance the carrier when the pawl is disengaged therefrom, said carrier-advancement-spring shifting the carrier in a direction to slidably shift the pawl therewith in the rack-engaging position of the pawl to an extent effective to deflect said distal portion of the plunger laterally preliminary to the next following bias of the pawl by said distal portion out of engagement with the rack.